Figure 1:
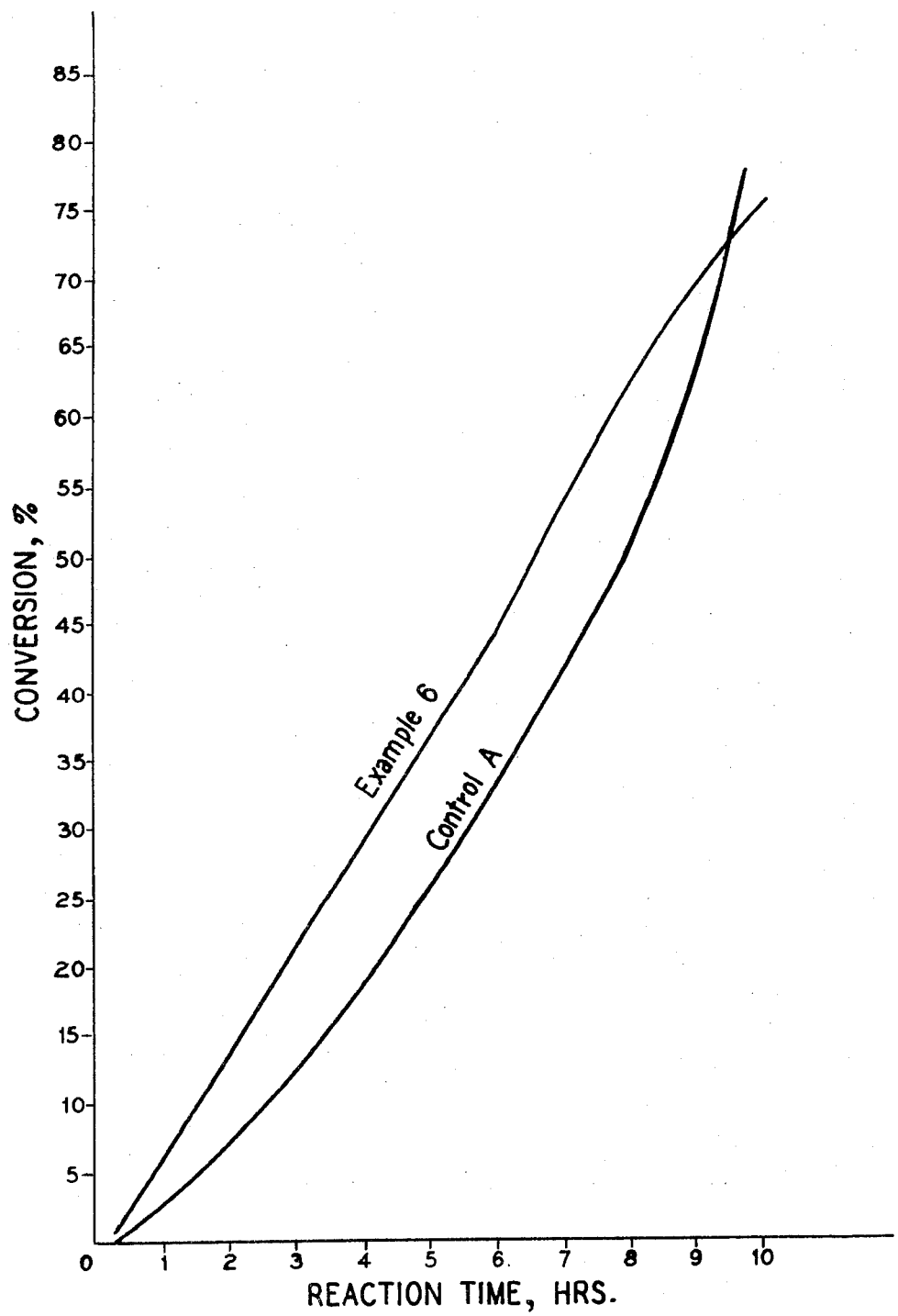

United States Patent [19]
Dawson et al.

[11] 3,862,076
[45] Jan. 21, 1975

[54] PREPARATION OF VINYL CHLORIDE POLYMERS IN AQUEOUS DISPERSION WITH ALPHA HALOGEN SUBSTITUTED UNSYMMETRICAL DIACYL PEROXIDE INITIATOR

[75] Inventors: Thomas L. Dawson, Charleston; Russell J. Hanna, South Charleston, both of W. Va.

[73] Assignee: Union Carbide Corporation, New York, N.Y.

[22] Filed: July 9, 1973

[21] Appl. No.: 377,536

Related U.S. Application Data

[63] Continuation-in-part of Ser. No. 193,741, Oct. 29, 1971, abandoned.

[52] U.S. Cl. ... 260/29.6 R, 260/29.6 F, 260/29.6 H, 260/29.6 RW, 260/32.8 R, 260/610 D
[51] Int. Cl. ............................................. C08f 45/24
[58] Field of Search .... 260/29.6 R, 92.8 W, 87.5 R, 260/610 D

[56] References Cited
UNITED STATES PATENTS

| | | | |
|---|---|---|---|
| 3,089,865 | 5/1963 | Walther et al. | 260/92.8 W |
| 3,502,701 | 3/1970 | Lewis et al. | 260/610 D |
| 3,527,743 | 9/1970 | Friedman et al. | 260/610 D |
| 3,536,675 | 10/1970 | Fagnoni et al. | 260/92.8 W |
| 3,652,681 | 3/1972 | Wood | 260/610 D |

*Primary Examiner*—Harold D. Anderson
*Attorney, Agent, or Firm*—Bernard Francis Crowe

[57] ABSTRACT

Vinyl chloride polymers have been prepared in aqueous dispersion leading to a stable latex by employing an alpha halogen substituted unsymmetrical diacyl peroxide as the monomer soluble polymerization initiator in which the alkyl chains on both sides of the initiator are about 11 to 17 carbon atoms in length.

14 Claims, 2 Drawing Figures

PREPARATION OF VINYL CHLORIDE POLYMERS IN AQUEOUS DISPERSION WITH ALPHA HALOGEN SUBSTITUTED UNSYMMETRICAL DIACYL PEROXIDE INITIATOR

This is a continuation-in-part of Ser. No. 193,741 filed Oct. 29, 1971 now abandoned.

BACKGROUND OF THE INVENTION

This invention pertains to an improved method of preparing vinyl chloride polymers in an aqueous dispersion and particularly at an essentially constant polymerization rate with the formation of a stable latex.

Vinyl chloride has been polymerized by all of the known addition polymerization techniques including bulk, solution, suspension and dispersion. Each of these techniques has its advantages and its limitations. Thus for example bulk polymerization leads to high purity products free of solvent, diluent, suspending agent or emulsifier and obviates the need for drying but yields particles of 50 microns or larger. However the control of the reaction rate and the removal of heat during polymerization are undesirable features. Solution polymerization affords vinyl chloride polymers low in impurities since no suspending or emulsifying agents are used but the production cost is high since precipitation into 100–300 micron particles is desirable from the point of view of handling requirements. Suspension polymerization employing water as the continuous phase exhibits good process control and low processing costs but the particle size range of the vinyl chloride polymers obtained is considerably larger, namely, in the range of 15 to 300 microns, than the polymer particles obtained by dispersion techniques which are under 2 microns.

Vinyl chloride dispersion resins have in the past been prepared by emulsion-in-water techniques using either a water-soluble initiator, which affords a true emulsion process, or a monomer-soluble initiator, which requires physical homogenization of the reactants with water to form an emulsion. The former process provides resins possessing a nearly uniform particle size. The latter technique provides resin particles possessing broad ultimate particle size distributions and is the subject of the instant invention.

The use of monomer-soluble initiators in vinyl chloride dispersion polymerization is complicated by the fact that polymerization temperatures must be closely controlled because of the effect of temperature on chain transfer to the monomer which in turn affects the molecular weight of the vinyl chloride polymers produced. The temperature profile of vinyl chloride dispersion polymerization must therefore be closely controlled in order to obtain commercially acceptable products. This goal is further obstructed by the need for monomersoluble polymerization initiators which decompose to free radicals at a rate sufficiently high to allow for optimum conversion times or have a half-life of about 1 to about 10 hours at a temperature in the range of 40°–55° C. Initiators having half-lives below this range are too reactive producing early exotherms beyond the heat transfer capacity of conventional reactors and erratic polymerization temperature profiles as well as low conversions of monomer to polymer. Since an autoacceleration in rate occurs in the precipitation polymerization of vinyl chloride, the use of initiators with half-lives above this range contributes to poor productivity of the batch process because of the abnormally long polymerization times which are required to avoid exceeding the heat transfer capabilities of the reactors late in the polymerization. The upper limit of the temperature range of about 40°–55° C. is set by the requirement that high molecular weight vinyl chloride dispersion resins are needed for satisfactory physical properties, and that poorer latex stability is encountered at high polymerization temperatures. Since the molecular weight of these resins is controlled by chain transfer to monomer, it is therefore dependent on polymerization temperature. To get reasonable reaction rates at moderately low initiator concentrations and to obtain resins which are low enough in molecular weight and crystallinity to be easily processed, it is preferred to not go below about 40° C.

Symmetrical alpha-halogen substituted diacyl peroxides have half-lives at 40°–55° C. which are too short for optimum vinyl chloride polymerization rates in this temperature range (they decompose too rapidly into free radicals) while unsubstituted symmetrical diacyl peroxides have half-lives which are too high for optimum vinyl chloride dispersion polymerization rates in this temperature range (they decompose too slowly into free radicals and therefore prolong the polymerization time to unrealistic limits).

Mixtures of symmetrical alpha-halogen substituted diacyl peroxides with symmetrical unsubstituted diacyl peroxides also give poor performance since they produce erratic polymerization rates as indicated by temperature profiles of vinyl chloride aqueous dispersion polymerizations utilizing such mixtures. Such temperature profiles, which are plots of reaction rate indicated by percent conversion of monomer to polymer per hour plotted as the ordinate against reaction time as the abscissa, show a saddleback curve instead of a general plateau-shaped curve. This is due to the fact that the two initiators operate separately and therefore one obtains too rapid a polymerization with the symmetrical alpha-halogen substituted diacyl peroxide and too slow a polymerization rate with the unsubstituted diacyl peroxide just as one observes when using either one alone.

Another requirement for commercially successful vinyl chloride aqueous dispersion polymerization systems is that one obtain a vinyl resin product in a mechanically stable latex form. If the latex product is not stable, the result is an excessive formation of scrap resulting in fouling of the polymerization reactors and excessive down time required for cleaning them between runs. Unstable latex formation also produces storage problems and complicates the use of the vinyl chloride resins in coating and other applications.

In order to obtain mechanically stable vinyl chloride polymer latex, it has been found necessary to emulsify the monomer or monomers to a stable emulsion by means of a high-shear device to obtain an emulsion with an ultimate droplet size of about 2 microns or less. The emulsion is then polymerized to a latex again with particle sizes of about 2 microns or less.

The half-life of the polymerization initiators is also restricted at the lower limit by virtue of the fact that initiators which decompose too rapidly may do so prior to the planned polymerization step, i.e., when the vinyl chloride monomer is being premixed and homogenized with water to form the feed for the polymerization reactor. Premature polymerization at this step is completely unacceptable and could be disastrous.

SUMMARY OF THE INVENTION

A method of preparing vinyl chloride polymers in an aqueous dispersion at an essentially constant polymerization rate with the formation of a stable latex has been found which comprises the steps of:

a. homogenizing to a droplet size of about 2 microns or less a mixture of (1) about 1 to about 150 parts by weight of vinyl chloride monomer, (2) 0 to about 50 parts by weight of an ethylenically unsaturated monomer copolymerizable with vinyl chloride, (3) about 0.001 to about 10 parts by weight of at least one surfactant, and (4) about 0.00005 to about 3 parts by weight of an unsymmetrical 2-halogen substituted diacyl peroxide having the formula:

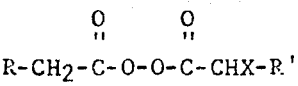

wherein each of R and R' is a higher alkyl group having about 10 to 16 carbon atoms and X is bromine or chlorine; with about 100 parts by weight of water;

b. heating the homogenized mixture of (a) in a pressure reactor under an inert atmosphere with stirring at a temperature of about 40° to about 55° C. for at least about 2 hours; and c. recovering a stable latex of vinyl chloride polymer having a particle size of about 2 microns or less.

DESCRIPTION OF THE INVENTION

Although about 1 to about 150 parts by weight of vinyl chloride monomer can be used per 100 parts of water, it is preferred to use about 45 to about 125 parts vinyl chloride with about 70 to about 100 parts being most preferred.

If an ethylenically unsaturated monomer copolymerizable with vinyl chloride is used in this invention, it is preferred to use up to about 10 parts by weight of said copolymerizable monomer per 100 parts of vinyl chloride monomer although amounts up to about 40 parts by weight per 100 parts of vinyl chloride monomer can be used if desired. Exemplary copolymerizable ethylenically unsaturated monomers include alpha-olefins such as ethylene, propylene, butylene, neohexene-1, and the like; vinyl esters such as vinyl acetate, vinyl propionate, vinyl butyrate, vinyl pelargonate, vinyl stearate and the like; alkyl acrylates or methacrylates having up to 18 carbons in the alkyl moiety, such as methyl methacrylate, ethyl acrylate, n-butyl acrylate, lauryl methacrylate, lauryl acrylate, hexadecyl acrylate, stearyl methacrylate, and the like; vinyl fluoride, vinylidene chloride, acrylonitrile, methacrylonitrile, acrylamide, maleic anhydride, maleic acid, fumaric acid, maleate and fumarate lower alkyl esters and half esters, and the like. Particularly preferred ethylenically unsaturated copolymerizable monomers are vinyl acetate and ethylene.

Representative unsymmetrical diacyl peroxides used as polymerization initiators in this invention include 2-chlorolauroyl lauroyl peroxide, 2-bromolauroyl lauroyl peroxide, 2-chloromyristoyl myristoyl peroxide, 2-bromomyristoyl myristoyl peroxide, 2-chloropalmitoyl palmitoyl peroxide, 2-bromopalmitoyl palmitoyl peroxide, 2-chlorostearoyl stearoyl peroxide, 2-bromostearoyl stearoyl peroxide, and the like. Although amounts of as little as 0.005 parts by weight or as great as 2 parts by weight of unsymmetrical alpha-halogen substituted diacyl peroxide may be used per 100 parts of total monomer charged, it is preferred to use a range of about 0.01 to about 0.50 parts by weight with a range of about 0.02 to about 0.20 parts by weight being even more preferred.

The method of homogenization is not critical and can be effected by high velocity passage between narrow clearances such as in commercial homogenizers, colloid mills, centrifugal pumps, other high shear devices, and the like or via ultrasonic devices. The homogenization of the monomers, initiator and water is aided by the use of suitable surfactants. For this purpose it is preferred to use anionic or mixtures of anionic and non-ionic surfactants because of the stability of the emulsions obtained thereby, but one can also employ non-ionic surfactants or cationic surfactants alone or mixtures of non-ionic and cationic surfactants. Polymeric surfactants, such as styrene/maleic acid copolymers and their salts, etc., can also be employed, as well as surfactants formed in situ during the polymerization of the vinyl chloride. Exemplary of the preferred surfactants are dioctyl esters of sodium sulfosuccinic acid, sodium lauryl sulfate/lauryl alcohol mixtures and sodium tetradecyl sulfate. Other surfactants which can be used include sodium lauryl sulfate alone, alkali metal alkylbenzene sulfonates, ammonium alkyl benzene sulfonates, alkali metal alkyl sulfate salt having from 10 to 20 carbon atoms in the alkyl group, ammonium alkyl sulfate salts having from 10 to 20 carbon atoms in the alkyl group, alkali metal salts of a fatty acid having from about 10 to about 20 carbon atoms therein, and ammonium salts of a fatty acid having about 10 to about 20 carbon atoms therein. It is preferred that the concentration of surfactants be held as low as possible since this reduces surfactant cost, gives less water-sensitive residue in the polymerized product, and also affords an increased vinyl chloride polymer particle size. Another factor determining the concentration of surfactant is the structure of the surfactant itself. Any level of surfactant above the concentration of about 0.1% based on the weight of the total monomer charged can be used, although there is an upper limit for a surfactant concentration where excess surface area problems are encountered. It is preferred to employ a range of about 0.4 to 1% surfactant based on the total monomer charged, especially when the total solids content of the latex formed in the polymerization step is of the order of about 40% by weight or greater.

In order to obtain high molecular weight vinyl chloride polymer which is easy to process, it is preferred to use the temperature range of about 40° C. to about 55° C., with a range of about 44° to 50° C. being particularly preferred.

While polymerization time is not narrowly critical in this invention, for practical purposes a polymerization time of at least 2 hours should be employed in order to have adequate time to remove the heat of polymerization from large production reactors. There is no upper time limit for the polymerization but obviously it is costly to proceed beyond the minimum time required for a practical conversion of monomer to polymer.

While not wishing to be bound by any theory or explanation, it is believed that the superior results obtained in the instant invention are due to the structure of the polymerization initiator whereby the chain length of the alkyl groups R and R' fall within relatively narrow limits and only one of the two alkyl side chains has a halogen substituent in the position alpha to the acyl peroxide group. It appears from this invention that polymerization initiators with long side chains and internal acyl peroxide structures are de rigeur for latex stability in homogenized vinyl chloride dispersion polymerizations. Attempts to use short-chain diacyl peroxide initiators or common active short-chain initiators such as acetyl cyclohexanesulfonyl peroxide and isopropyl peroxydicarbonate have been unsuccessful in homogenized vinyl chloride dispersion polymerizations. It is postulated that a long chain length such as claimed is required in the use of vinyl chloride dispersion polymerizations because the diacyl peroxide initiator molecule and/or resultant primary free radical must possess surface activity so that initiation of polymerization occurs at the surface of the monomer droplet. A second explanation that suggests itself from the observed phenomena is that minute water solubilities of the shorter chain length initiator molecules and/or resultant primary free radicals create enough water-phase initiation to give an increase in the number of particles and surface area thereof. This leads to a decrease in latex stability at a constant surfactant concentration. The requirement of having unsymmetrical alpha-halogenated diacyl peroxide with alkyl side chains of the length claimed obtains within a narrow range inasmuch as di-n-octanoyl peroxide affords poor latex stability when used as an initiator of vinyl chloride dispersion polymerizations. Similarly 2-bromooctanoyl octanoyl peroxide as well as 2-chlorooctanoyl octanoyl peroxide also will produce poor latex stability when used as initiators of vinyl chloride dispersion polymerizations. The requirements of having internal acyl peroxide structures is illustrated by the use of reactive long-chain peroxydicarbonates, such as ditetradecyl and dicetyl peroxydicarbonates, which give poorer latex stability and an increase in the number of particles in the polymeric product having a size of less than 0.1 micron. The smaller particles produce certain undesirable properties in plastisols and organosols such as higher initial viscosities and faster increases in viscosity on aging. Thus in order to obtain latex stability with an alpha halogen substituted unsymmetrical diacyl peroxide, long alkyl chains containing at least 11 carbon atoms on both sides of the acyl peroxygen group are required.

It will be recognized by those skilled in the art that other optional ingredients may be used in the method of this invention including buffers, colorants, stabilizers, plasticizers, dyes, and the like without detracting from the desired results.

Conventional polymerization equipment known to those skilled in the art can be used in the practice of this invention.

The invention is further described in the examples which follow. All parts and percentages are by weight unless otherwise specified.

EXAMPLE 1

A homogeneous solution containing 2.89 grams of 2-bromolauroyl lauroyl peroxide dissolved in 1,806 grams of vinyl chloride monomer containing 3 parts per million of t-butyl catechol inhibitor was mixed at 50 psig at 22° C. for 15 minutes with an aqueous solution containing 13.55 grams of the sodium sulfate derivative of 7-ethyl-2-methyl, 4-undecanol and 0.452 grams of sodium bicarbonate dissolved in 2,394 grams of water. This premix was then passed through a two-stage Manton-Gaulin homogenizer with a pressure of 1,350 psig at each stage. The homogenized mix having a droplet size of 2 microns or less was passed into a pressure reactor maintained with nitrogen at 60 psig where the mix was stirred slowly to maintain a 45° C. polymerization temperature at a pressure of about 120 psig. After 12 hours and 40 minutes the pressure of the closed reactor had dropped about 20 psi indicating a high conversion of vinyl chloride to poly(vinyl chloride). The pressure reactor was vented and unreacted vinyl chloride monomer stripped off while cooling the poly(vinyl chloride) latex to ambient temperature. The recovered poly(vinyl chloride) latex having a particle size of 2 microns or less contained 37.8% total solids and only 6.1% of the total resin was lost as scrap. Scrap is defined as the sum of coagulated particles in the latex and coatings on the reactor walls, stirring paddle and other equipment surfaces. Dry poly(vinyl chloride) resin was obtained from the latex by spray drying the latex in a small spray dryer. The dry poly(vinyl chloride) resin was ground twice by passing it through a small Mikro-Pulverizer grinder.

A plastisol formulation was prepared from 100 parts of the poly(vinyl chloride) prepared in this example above, 56 parts of dioctyl phthalate, 2 parts of 2-ethylhexyl-9, 10-epoxytallate plasticizer and 2 parts of a mixture of barium alkyl phenylate with calcium and zinc octoate (Mark KCB stabilizer). This plastisol formulation had a RVT Brookfield viscosity (No. 6 spindle at 20 rpm) after 1 day of 104 poises at 25° C. After 3 days the viscosity had increased to 184 poises at 25° C.

The vinyl chloride resin prepared as above was also formulated into an organosol containing 80 parts of the resin prepared above, 20 parts of a terpolymer containing 83% vinyl chloride, 16% vinyl acetate and 0.9% maleic acid interpolymerized therein, 35 parts of diisobutyl ketone, 20 parts of isophorone, 90 parts of Solvesso 150 (97% mixture of aromatic hydrocarbons with a boiling point range of 370°–410° F.), 5 parts of butyl CARBITOL (Trade Mark for the monobutyl ether of diethylene glycol), and 5 parts of ERL-2774 (a diglycidyl ether of bisphenol A). These ingredients were mixed for 5 minutes at 40° C. and then ground for an additional 10 minutes with glass beads at 40° C. The Stormer viscosity of this organosol was 120 Krebs units after 2 hours at 24°–25° C. and 127 Krebs units after 1 day when stored and measured at 24°–25° C.

The 2-bromolauroyl lauroyl peroxide used as the initiator above can be prepared by mixing an aqueous solution of an alkali metal peroxide with 1 mole of 2-bromolauroyl chloride dissolved in toluene and then adding dropwise 1 mole of lauroyl chloride to the solution stirred at 0° to 25° C. for at least 0.5 hours, lowering the pH of the resultant stirred mixture to about 1.5 by acidification with sulfuric acid and then removing a solution of 2-bromolauroyl lauroyl peroxide dissolved in the toluene layer in a separatory funnel. An assay can be made by titration of the peroxide in the toluene solution and the toluene solution then used as such for the polymerization of vinyl chloride monomer.

EXAMPLE 2

Example 1 was repeated with the exception that the vinyl chloride contained 5 parts per million of t-butyl catechol, the sodium sulfate derivative of 7-ethyl-2-methyl, 4-undecanol was replaced with 13.0 grams of sodium lauryl sulfate and 18.9 grams of lauryl alcohol, the homogenizer pressures were 1,000 psig on the first stage and 500 psig on the second stage, and the polymerization temperature was 46° C. The total polymerization time was 8 hours.

The resultant poly(vinyl chloride) latex had a solids content of 37.6% and 9.4% of the total resin was scrap.

The Brookfield viscosity of the plastisol prepared, stored and measured as described in Example 1 was 174 poises after 1 day and 210 poises after 3 days. The Stormer viscosity of the organosol prepared, stored and measured as described in Example 1 was 100 Krebs units after 2 hours and 106 Krebs units after 1 day.

EXAMPLE 3

Example 2 was repeated with the exception that only 1.73 grams of 2-bromolauroyl lauroyl peroxide was employed, the vinyl chloride contained 10 parts per million of t-butyl catechol inhibitor and 22.4 grams of trichloroethylene, the amounts of sodium lauryl sulfate and lauryl alcohol were 13.55 grams and 19.65 grams respectively and the polymerization temperature was 50° C. The total polymerization time was 11 hours and 20 minutes.

The resultant poly(vinyl chloride) latex had a solids content of 36.0% and 10% of the total resin was scrap.

The Brookfield viscosity of the plastisol prepared, stored and measured as described in Example 1 was 69 poises after 1 day and 77.5 poises after 3 days.

EXAMPLE 4

Example 1 was repeated with the exception that 5 parts per million of t-butyl catechol and 2.23 grams of 2-chlorolauroyl lauroyl peroxide were dissolved in the vinyl chloride. The total polymerization time was 10 hours and 25 minutes.

The resultant poly(vinyl chloride) latex had a solids content of 37.95% and 5.9% of the total resin was scrap.

The Brookfield viscosity of the plastisol prepared, stored and measured as described in Example 1 was 73.5 poises after 1 day and 104.5 poises after 3 days. The Stormer viscosity of the organosol prepared, stored and measured as described in Example 1 was 98 Krebs units after 2 hours and 108 Krebs units after 1 day.

The 2-chlorolauroyl lauroyl peroxide used in this Example was prepared in a manner analogous to the preparation of 2-bromolauroyl lauroyl peroxide with the exception that 2-chlorolauroyl chloride was used in place of the 2-bromolauroyl chloride.

EXAMPLE 5

Example 1 was repeated with the exception that a homogeneous solution containing 1.68 grams of 2-bromolauroyl lauroyl peroxide dissolved in 1,864 grams of vinyl chloride containing 5 parts per million of t-butyl catechol inhibitor was mixed at 50 psig at 20° C. for 15 minutes with an aqueous solution containing 11.17 grams of dioctyl sodium sulfosuccinate and 0.559 grams of sodium bicarbonate dissolved in 2,471 grams of water. The polymerization temperature was 44° C. and the polymerization time was 18 hours and 14 minutes.

The resultant poly(vinyl chloride) latex had a solids content of 38.06% and 6.3% of the total resin was scrap.

The Brookfield viscosity of the plastisol prepared, stored and measured as described in Example 1 was 30 poises after 1 day and 34.5 poises after 3 days. The Stormer viscosity of the organosol prepared, stored and measured as described in Example 1 was 71 Krebs units after 2 hours and 86 Krebs units after 1 day.

EXAMPLE 6

The following Example is compared with a Control A to demonstrate the difference in reaction rate profile when using 2-chlorolauroyl lauroyl peroxide as the polymerization initiator for the polymerization of vinyl chloride monomer as distinct from the use of dilauroyl peroxide as the initiator for the polymerization of vinyl chloride monomer. The same general procedure as used in Example 1 was employed with 0.086% 2-chlorolauroyl lauroyl peroxide and dioctyl sodium sulfosuccinate was employed as a surfactant and the polymerizations were conducted at 45° C. Control A was run under the same conditions except that 1.0 weight % of dilauroyl peroxide was used as initiator.

The resultant poly(vinyl chloride) latexes obtained for Example 6 and Control A respectively had solids contents of 36.0 and 36.3%.

Differences between the use of these two initiators is illustrated in FIG. 1 which is a plot of percent conversion of vinyl chloride monomer to vinyl chloride polymer as the ordinate vs. reaction time in hours as the abscissa. This plot shows that less than 1/10 as much 2-chlorolauroyl lauroyl peroxide as dilauroyl peroxide was required to give similar polymerization times but more importantly the rate of polymerization using 2-chlorolauroyl lauroyl peroxide is reasonably constant while the polymerization rate using dilauroyl peroxide increases markedly throughout the polymerization.

Figure 2:
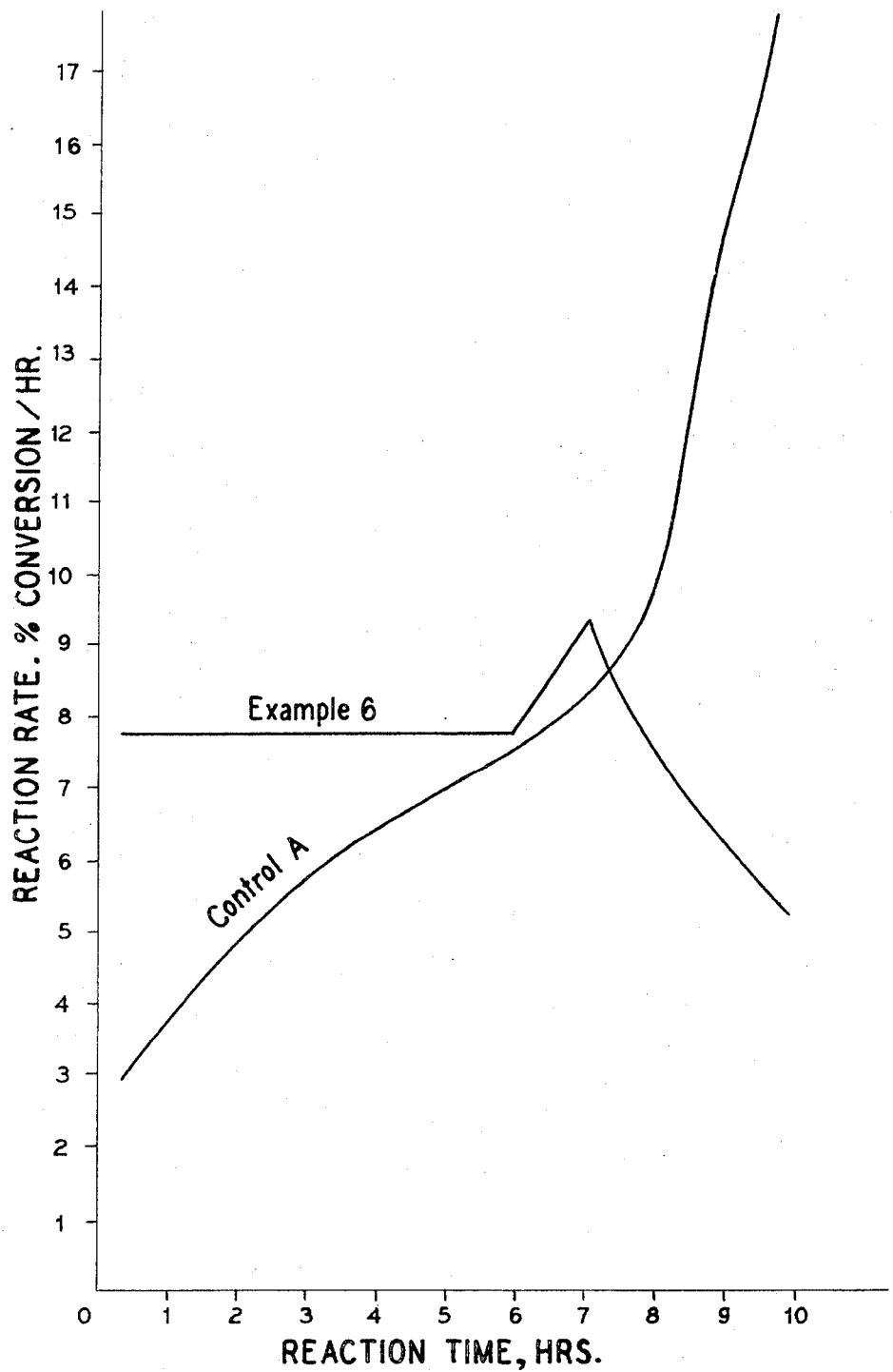

FIG. 2 illustrates the reaction rate profiles for the same polymerizations represented as differential plots where the ordinate is weight % conversion of vinyl chloride to vinyl chloride polymer per hour, i.e., the reaction rate vs. the reaction time in hours as the abscissa. From this it can be seen that for the first 6 hours of the polymerization the rate is almost constant for the 2-chlorolauroyl lauroyl peroxide whereas the dilauroyl peroxide causes a rapid increase in polymerization rate.

These data illustrate that when dilauroyl peroxide is used as the polymerization initiator, the initial reaction rate is slow and therefore the total polymerization time required must be longer so that the fast rate which occurs near the end of the polymerization will not exceed the heat transfer capabilities of the polymerization reactor. On the other hand, when the alpha substituted unsymmetrical diacyl peroxides of this invention are used as the initiators the initial reaction rates are faster and do not increase as markedly so that shorter polymerization times and higher productivities can be realized. This is actually substantiated in a plant run where 6 hours polymerization time were saved resulting in about a 25% decrease in polymerization time and a 15% net increase in productivity. This run is shown below as Example 7.

EXAMPLE 7

Example 1 was repeated in production facilities with the exceptions that 9.86 pounds of 2-bromolauroyl lauroyl peroxide dissolved in 14,500 pounds of vinyl chloride containing 3 parts per million of t-butyl catechol was mixed at ambient temperature for 20 minutes with an aqueous solution containing 97 pounds of the sodium sulfate derivative of 7-ethyl-2-methyl, 4-undecanol and 3.6 pounds of sodium bicarbonate dissolved in 16,350 pounds of water, the homogenizer pressures were 1,000 psig on the first stage and 500 psig on the second stage, and the polymerization temperature was 47° C. at a pressure of about 91 psig. The polymerization time was 16 hours and the pressure drop in the reactor 20 psi pressure.

The resultant poly(vinyl chloride) latex had a solids content of 39.7% and only about 300 pounds of resin scrap remained in the reactor after the latex was transferred. The latex from this run was combined with latex from a duplicate run.

Poly(vinyl chloride) resin was obtained from the latex by spray drying the latex and then grinding, the dry resin in production facilities.

The Brookfield viscosity of the plastisol prepared, stored and measured as described in Example 1 was 54 poises after 1 day and 62 poises after 3 days. The Stormer viscosity of the organosol prepared, stored and measured as described in Example 1 was 91 Krebs units after 2 hours and 96 Krebs units after 1 day.

EXAMPLE 8

The following example was run using the same general procedure as Example 6 except that (1) the monomer mix contained 1,703 grams of vinyl chloride and 157 grams of vinyl acetate, i.e., 8.4% of the monomer mix was vinyl acetate, (2) the initiator was 0.0456 per cent 2-bromolauroyl lauroyl peroxide based on total monomer, and (3) the polymerization was conducted at 48° C. After 21.5 hours the pressure in the closed reactor had dropped about 40 psi indicating a high conversion of monomer to polymer. The pressure reactor was vented and unreacted vinyl chloride monomer stripped off while cooling the vinyl chloride/vinyl acetate copolymer latex to ambient temperature. The recovered copolymer latex had a particle size of 2 microns or less, contained 34.5% total solids and was obtained with only 5.6% of the total resin being lost as scrap. Dry vinyl chloride/vinyl acetate copolymer resin was obtained from the latex by spray drying the latex in a small spray dryer. The dry copolymer resin was ground twice by passing it through a small Mikro-Pulverizer grinder.

The Brookfield viscosity of the plastisol prepared, stored and measured as described in Example 1 was 66 poises after 1 day and 95 poises after 3 days.

EXAMPLES 9–19

When the procedure described in Example 1 is repeated with the exception that either vinyl propionate, methyl methacrylate, ethyl acrylate, diethyl fumarate, diethyl maleate, ethylene, propylene, vinylidene chloride, vinyl fluoride, acrylonitrile, or acrylamide are copolymerized with the vinyl chloride at a concentration of approximately 5% by weight of the vinyl chloride charged, stable vinyl chloride copolymer latexes are obtained at comparable polymerization rates.

In order to demonstrate the utility of unsymmetrical 2-halogen substituted diacyl peroxides having 12 to 18 carbon atoms in the peroxide moiety for the preparation of a stable vinyl chloride polymer latex experiments were carried out with 2-bromostearoyl stearoyl peroxide, 2-bromolauroyl lauroyl peroxide and 2-bromooctanoyl octanoyl peroxide. These experiments are delineated below as Example 20, Example 21 and Control B respectively.

EXAMPLE 20

A homogeneous solution containing 1.9161 g. (0.00297 mole) of 2-bromostearoyl stearoyl peroxide dissolved in 1,864 g. of vinyl chloride containing 2.5 parts per million of tert-butyl catechol inhibitor was mixed at 50 psig at 20° C. for 15 minutes with an aqueous solution containing 13.98 g. of TERGITOL 4 (active component sodium sulfate derivative of 7-ethyl-2-methyl, 4-undecanol) and 0.466 g. of $NaHCO_3$ dissolved in 2,420 g. of water. This premix was then passed through a two-stage Manton-Gaulin homogenizer with a pressure of 1,350 psig at each stage. The homogenized mix having a droplet size of 2 microns or less was passed into a pressure reactor maintained at 60 psig where it was stirred slowly to maintain a 47° C. polymerization temperature at an initial pressure of 120–125 psig. After 16.3 hours the pressure on the closed reactor had dropped about 34 psi illustrating a high conversion of the vinyl chloride to poly(vinyl chloride). The pressure reactor was vented and unreacted vinyl chloride monomer stripped while cooling the poly(vinyl chloride) latex to ambient temperature. The recovered poly(vinyl chloride) latex having a particle size of 2 microns or less contained 38.5 per cent total solids, and only 5.3 per cent of the total resin was lost as scrap.

EXAMPLE 21

Example 21 was the same as Example 20 with the exception that 1.3838 g. (0.00290 mole) of 2-bromolauroyl lauroyl peroxide was used in the place of the 2-bromostearoyl stearoyl peroxide of Example 20. After 16.8 hours the pressure had dropped 36 psi and the reaction was stripped as described in Example 20. The recovered poly(vinyl chloride) latex having a particle size of 2 microns or less contained 38.0 per cent total solids and 10 per cent of the total resin was scrap.

CONTROL B

Control B was also the same as Example 20 but with the exception that 1.1187 g. (0.00306 mole) of 2-bromooctanoyl octanoyl peroxide was used in the place of the 2-bromostearoyl stearoyl peroxide of Example 20. Heavy scrap was formed early in the polymerization as evidenced by the loss of temperature control; the polymerization temperature cycled between 44.5° and 48.9° C. After 16.8 hours the pressure had dropped 30 psi, again illustrating a high conversion of the vinyl chloride to poly(vinyl chloride), and the reaction was stripped as described in Example 21. There was no latex, that is, 100 per cent of the resin was scrap.

Although the invention has been described in this preferred form with a certain amount of particularity, it is understood that the present disclosure has been made only by way of example and that numerous changes can be made without departing from the spirit and the scope of the invention.

What is claimed is:

1. Method of preparing vinyl chloride polymer resin in an aqueous dispersion at an essentially constant polymerization rate with the formation of a stable latex which comprises the steps of:
   a. homogenizing to a droplet size of about 2 microns or less a mixture of (1) about 1 to about 150 parts by weight of vinyl chloride monomer, (2) 0 to about 50 parts by weight of an ethylenically unsaturated monomer copolymerizable with vinyl chloride, (3) about 0.001 to about 10 parts by weight of at least one surfactant, and (4) about 0.00005 to about 3 parts by weight of an unsymmetrical 2-halogen substituted diacyl peroxide having the formula:

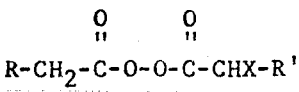

wherein each of R and R' is a higher alkyl group having about 10 to 16 carbon atoms and X is bromine or chlorine, per about 100 parts by weight of water;
b. heating the homogenized mixture of (a) in a pressure reactor under an inert atmosphere with stirring at a temperature of about 40° to about 55° C. for at least about 2 hours; and
c. recovering a stable latex of vinyl chloride polymer.

2. Method claimed in claim 1 wherein the halogen X is chlorine.

3. Method claimed in claim 1 wherein the halogen X is bromine.

4. Method claimed in claim 1 wherein both R and R' contain 10 carbon atoms.

5. Method claimed in claim 1 wherein the vinyl chloride monomer is homogenized with about 1 to about 20 parts by weight of an ethylenically unsaturated monomer copolymerizable with vinyl chloride.

6. Method claimed in claim 5 wherein the ethylenically unsaturated monomer is vinyl acetate.

7. Method claimed in claim 5 wherein the ethylenically unsaturated monomer is ethylene.

8. Method claimed in claim 1 wherein the surfactant is sodium dioctyl sulfosuccinate.

9. Method claimed in claim 1 wherein the surfactant is sodium lauryl sulfate.

10. Method claimed in claim 1 wherein the surfactant is a mixture of sodium lauryl sulfate and lauryl alcohol.

11. Method claimed in claim 1 wherein the surfactant is an alkyl benzene sulfonate.

12. Method claimed in claim 1 wherein the surfactant is an alkali metal alkyl sulfate salt having 10 to 20 carbon atoms in the alkyl group.

13. Method claimed in claim 1 wherein the surfactant is an alkali metal salt of a fatty acid having 10 to 20 carbon atoms in the alkyl group.

14. Method claimed in claim 1 wherein the temperature in step (b) is about 44°–50° C.

* * * * *